United States Patent [19]
Hallgren

[11] Patent Number: 5,993,146
[45] Date of Patent: *Nov. 30, 1999

[54] APPARATUS FOR FACILITATING UNLOADING AND LOADING OF ARTICLES ON PALLETS

[75] Inventor: Sigvard O. Hallgren, Branford, Conn.

[73] Assignee: Blakesle Arpia Chapman, Branford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/674,894

[22] Filed: Jul. 3, 1996

[51] Int. Cl.⁶ .................................................. B65G 57/22
[52] U.S. Cl. ..................... 414/792.2; 414/672; 187/269
[58] Field of Search ..................... 414/592, 608, 414/619, 672, 673, 263, 791.6, 792.2; 187/269, 401

[56] References Cited

U.S. PATENT DOCUMENTS

| | | | |
|---|---|---|---|
| 1,405,301 | 1/1922 | De Vol | 187/269 |
| 2,284,531 | 5/1942 | Miller et al. | 187/269 |
| 2,515,075 | 7/1950 | Brereton | 187/401 |
| 2,642,957 | 6/1953 | Watts, Jr. et al. | 187/401 |
| 4,261,079 | 4/1981 | Masini et al. . | |
| 4,298,305 | 11/1981 | Neth . | |
| 4,356,887 | 11/1982 | Fisher et al. . | |
| 4,594,044 | 6/1986 | Soot . | |
| 4,830,147 | 5/1989 | Kanoda . | |
| 4,941,797 | 7/1990 | Smillie, III | 187/269 |
| 4,946,006 | 8/1990 | Kume . | |
| 5,018,923 | 5/1991 | Melan et al. . | |
| 5,281,017 | 1/1994 | Geiss . | |
| 5,299,906 | 4/1994 | Stone | 187/269 |

FOREIGN PATENT DOCUMENTS 198916  8/1958  Germany ............................ 414/672

OTHER PUBLICATIONS

Southworth Products Corp., "Pallet Level Loaders", 4 pages, 1995.

*Primary Examiner*—Karen B. Merritt
*Assistant Examiner*—Gregory A. Morse
*Attorney, Agent, or Firm*—Robert H. Montgomery

[57] ABSTRACT

A tub-like member is recessed below floor surface level in a pit and carries therein an extendable and retractable lifting mechanism. The tub includes a horizontal outwardly extending flange essentially at floor surface level, and overlying the floor surface, which a loader/unloader may easily manipulate with foot pressure to rotate the tub and stacked articles on a pallet carried on the lifting mechanism within the tub-like member. Easily operable controls are provided for the loader/unloader to incrementally raise and lower the lifting mechanism to present the top article of a stack on a pallet at a comfortable lifting height. Also included is a new and improved mechanism for supporting a pallet for manual rotation and incrementally controlled vertical movement.

16 Claims, 3 Drawing Sheets

FROM AIR RESERVOIR

APPARATUS FOR FACILITATING UNLOADING AND LOADING OF ARTICLES ON PALLETS

FIELD OF THE INVENTION

This invention relates to apparatus for loading and unloading stacked containers or container bags on or from a carrier such as a pallet.

BACKGROUND OF THE INVENTION

It is common practice to load articles in stacks on a pallet and also unload stacked articles on pallets. The pallets are commonly lifted and transferred from a loading point to a vehicle or may be transferred from a vehicle to an unloading point. Pallet loading and unloading is commonly done manually where each palletized article is lifted from or placed on a pallet from heights varying from just above floor level, i.e. the height of the pallet, to a height which requires substantial upper body strength to manage. This requires repetitive bending over of the person loading a pallet and also lifting above waist level as the stack of articles grows in height. The reverse motions occur as a pallet is unloaded. This is true even though the article is lifted from a conveyor or deposited on a conveyor. In many environments articles to be loaded may be presented by a conveyor at a comfortable height for lifting, but the loading person must initially bend over to deposit articles on a pallet and then lift substantially above waist level as the stack of articles on the pallet increases in height. The reverse is true when unloading from a pallet to a conveyor. Additionally, where plural stacks are to be loaded on or unloaded from a pallet the loader or unloader must move around the pallet to reach all of the stacks.

These manual lifting and depositing operations place severe strains on a person's back, and it is not unusual to lead to back injuries and long term disability.

Additionally, continuous stooping and lifting as well as high lifting and unloading can be very fatiguing and leads to slowing of loading/unloading efforts.

The present invention provides a new and improved apparatus for facilitating the loading and unloading of stacks of articles on a pallet where the person always has the top article on a pallet presented at a comfortable removal height. Similarly, the invention permits the loading of stacks of articles always at a comfortable height, which may be also referred to as an ergonomic height, even as the height of the stack increases. Moreover, the invention permits the pallet to be rotated to facilitate access to plural stacks of articles thereon.

An object of this invention is to provide a new and improved apparatus for loading articles on a pallet and also to present articles for unloading, from a pallet, at an ergonomic height.

Another object of this invention is to provide such an apparatus which is easily rotatable to present one of a plurality of stacks of articles on a pallet to an unloader at a comfortable height and location, and at a predetermined loading or unloading point.

Another object of this invention is to provide such an apparatus which a pallet loader/unloader may easily and safely manipulate for height and angular position.

A further object of this invention is to provide a new and improved apparatus to facilitate rotation of a table bearing a pallet with plural stacks of articles and also vertically adjust the table to present the top article of a stack at an ergonomic height.

SUMMARY OF THE INVENTION

Briefly stated, the invention, in one form thereof, comprises a tub-like member which is recessed below floor surface level and which carries therein an extendable and retractable lifting mechanism. The tub includes a horizontal outwardly extending flange essentially at floor surface level which a loader/unloader may easily manipulate with foot pressure to rotate the tub and stacked articles on a pallet carried on the lifting mechanism within the tub-like member. Easily accessible and operable control means are provided for the loader/unloader to incrementally raise and lower the lifting mechanism to present the top article of a stack on a pallet at a comfortable height for loading or unloading.

The invention further provides a new and improved mechanism for supporting a pallet for manual rotation and incrementally controlled vertical movement.

The features of the invention which are believed to be novel are particularly pointed out and distinctly claimed in the concluding portion of this specification. The invention, however, together with further objects and advantages thereof, may best be appreciated by reference to the following description taken in conjunction with the drawings.

DETAILED DESCRIPTION OF THE DRAWINGS

DESCRIPTION OF PREFERRED EMBODIMENT OF THE INVENTION

Figure 1:
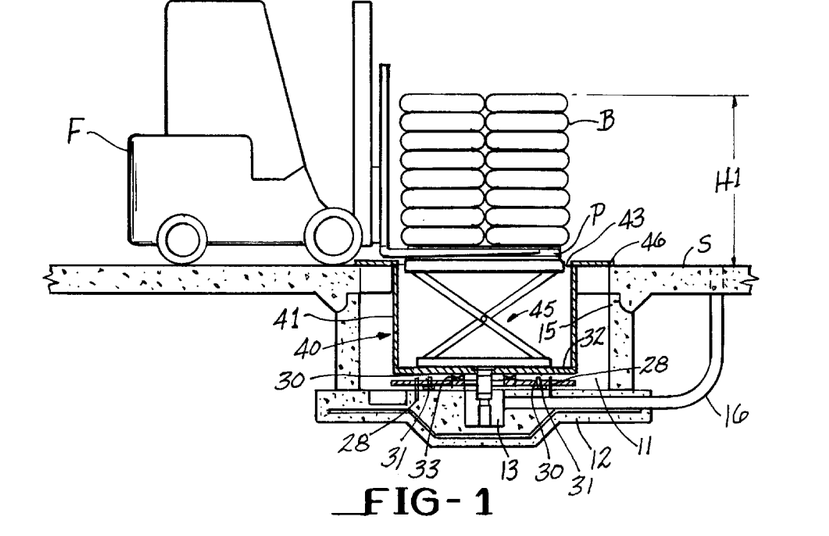
FIG. 1 is an elevation showing a fork lift truck depositing a loaded pallet on apparatus embodying the invention, which is shown in half section.

FIG. 1 exemplifies a forklift truck F depositing a pallet P loaded with a plurality of stacks of sacks or bags B thereon while the load receiving surface of a lifting mechanism utilized in the invention is at essentially floor surface level S, which may be considered to be a reference level.

These stacks of bags B extend to a height H1 above surface S. Such height is usually well above human waist or chest level and ordinarily requires substantial lifting to load the upper bags of a stack or to unload bags therefrom.

Figure 6:
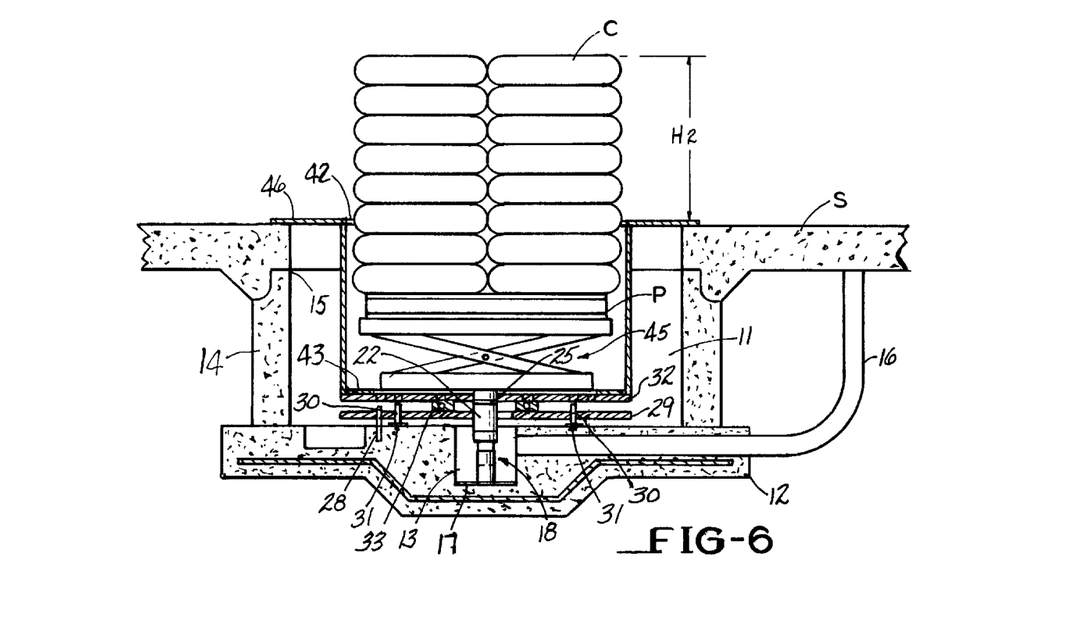
FIG. 6 is a view similar to FIG. 1, but with the fork lift truck removed and the pallet and load thereon lowered.

Reference is now made to FIG. 6, which shows the load receiving surface retracted into a pit 11 such that the top bag B of each stack is at a height H2 above surface S. At height H2 which may be termed a comfortable or ergonomic height, the loader/unloader will not have to do any or very little bending of his back to transfer a bag B to or from a stack with respect to a loading/unloading point.

A typical loading/unloading point may be the end of a conveyor as exemplified in FIG. 5, hereinafter discussed. Here, containers B may be presented for loading on a pallet or in some installations may be transferred from a pallet to conveyor for movement to another location.

Referring back to FIG. 1, apparatus embodying the invention is received within an especially constructed and defined recess or pit 11 below surface S. The pit 11 is defined by a base member shown as a reinforced concrete footing 12 having a central recess 13 for purposes hereinafter described. Footing 12 supports an annular concrete pipe 14 which at the upper spout end 15 thereof provides an edge support for the slab which defines surface S. Pipe 14 defines the wall of pit 11.

When the invention is installed while a plant is being built, the footing 12 then pipe 14 are installed, and a conduit 16 is provided to provide communication with recess 13 and the slab defining surface S is poured. Footing 12 defines the floor of pit 11.

Figure 2:
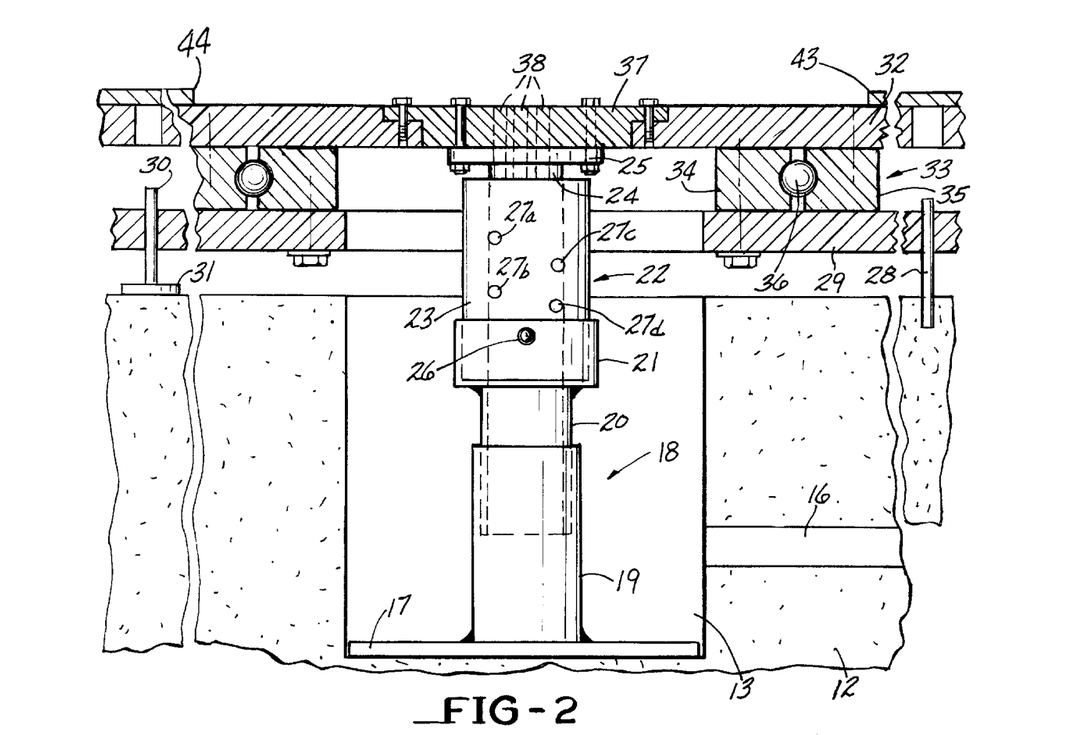
FIG. 2 is an enlargement of a portion of FIG. 1.

If the invention is to be installed at an existing installation, the floor slab will have to be broken up and removed, a recess for pit 11 defined, footing 12, pipe 14 and conduit 16 installed and the removed floor slab repoured. Conduit 16 may be, at least partially, placed in footing 12 when the footing is poured or a passage is defined in the form for the footing after which the conduit 16 is later inserted. As will hereinafter be described, conduit 16 provides a passage for control lines to a lifting mechanism. Reference is also made now to FIG. 2 which shows a portion of FIG. 1 enlarged in size.

Disposed upon a plate 17 within recess 13, as shown in larger detail in FIG. 2, is an assembly 18. Recess 13 and plate 17 are preferably rectangular so that plate 17 cannot rotate. Assembly 18 comprises two telescoping box cross-sectional members 19 and 20 and also has affixed thereto, at the upper end of member 20, a cup shaped member 21. Member 21 carries a rotating union 22 comprising an outer cylindrical casing 23 with an inner rotating shaft 24 therein. Shaft 24 has an attachment collar or a platform 25 at the upper end thereof. The outer casing 23 is fixed by a nipple or pin 26 to cup-shaped member 21. Assembly 18 serves to lock the casing 23 of rotating union 22 against rotation and also center shaft 24 of rotating union as hereinafter made apparent. Casing 23 also has four ports 27a–27d defined therein which are utilized as hereinafter described. The ports 27a–27d communicate with passages (not shown) in shaft 24 and platform 25. These passages define a portion of fluid control lines as hereinafter described in conjunction with FIG. 5. Rotating unions are well-known for the purpose of providing fluid communication between a stationary member and a rotating member and need not be discussed in detail.

A suitable rotating union is made by Deublin Company of Waukegan, Ill., Model 479-400. Other models or makes may be utilized depending on specifications.

Embedded in and extending upwardly from footing 12 are a plurality of bolts 28 which extend through a first support plate 29. Plate 29 also receives a plurality of leveling bolts 30 therethrough bearing on pads 31 on footing 12 (FIG. 1) which support plate 29 on footing 12 and provide a means for leveling plate 29. A second support member or plate 32 is rotatably supported on plate 28 by an annular bearing 33. As shown in FIG. 2, bearing 33 comprises an inner race 34, an outer race 35 and bearing elements 36 therebetween.

Bearing 33 is secured to both plates 29 and 31 as shown. With this arrangement, support plate 29 is prevented from rotation by bolts 28 and leveled by means of bolts 30 bearing on pads 31. Plate 32 is rotatable with the shaft of union 24.

With this arrangement, plate 32 is free to rotate with union shaft 24. By virtue of the telescoping arrangement of union support 18, sections 19 and 20, union 23 carries no loading, but permits rotation of plate 32 and communication of control and/or power lines as hereinafter described.

Fitted into plate 32 in a central recess provided therefor is an adaptor plate 37 having a plurality of passages there-through designated as 38 which communicate with passages 27a–27d in union 22, shaft 24 and platform 25. Plate 37 is axially fixed to platform 25 of rotating union 22 and vertically supports union 22, cup 21 and section 20.

With the construction thus far described, plate 32 may rotate with respect to support plate 29 in pit 11 while fluid communication passages are provided through rotating union 22 to the upper surface of adaptor plate 37.

Carried on plate 32 is a container or tub-like member 40 having rectangular side walls 41 and an annular top 42. The side walls are directly fastened to plate 32 to form the container, as shown. Top 42 has a rectangular aperture 44 therein as more clearly shown in FIG. 5 to permit an elevating or lifting mechanism 45, as hereinafter more fully described, to extend therethrough. Top member 42 also provides a flange 46 which overlies surface S to a small extent, and has a very small clearance with surface S. In FIGS. 1 and 6, lifting mechanism 45, for simplicity of illustration is shown as a single scissors jack.

This arrangement permits tub-like member 40 to be rotated by small foot force and rotate elevating mechanism 45 therein with pallet P thereon.

Figure 3:
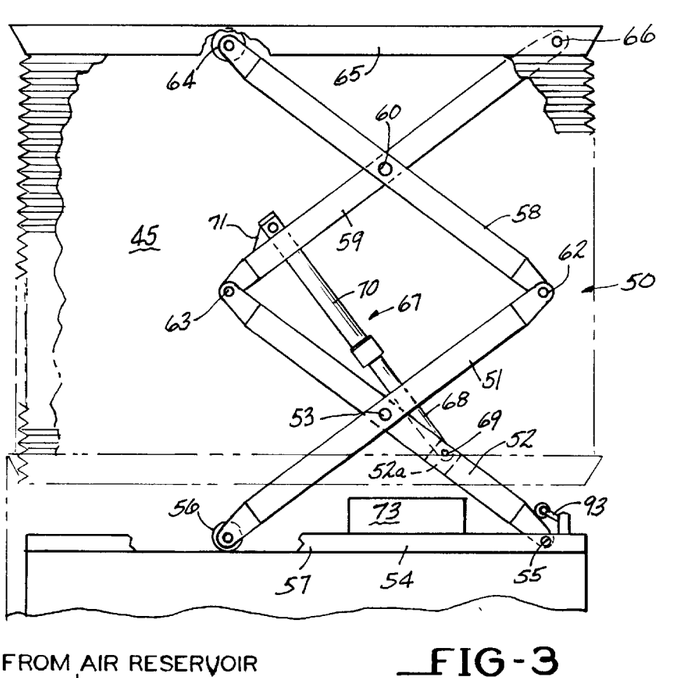
FIG. 3 is an elevation of a scissors lift utilized in the invention.

The lifting member 45, in the disclosed embodiment, may comprise a double scissors lift table 50 as shown in FIG. 3.

Lift table 50 comprises a lower pair of arms 51 and 52 centrally pivoted at 53. Arm 52 is pivoted to a base member 54 at 55, while arm 51 carries a roller 56 which moves in a channel on base member 54. Upper arms 58 and 59 are centrally pivoted at 60 and pivoted at their lower ends to the upper ends of arms 51 and 52 at points 62 and 63, all respectively. The upper end of arm 58 carries a roller 64 which facilitates movement of the upper end of arm 58 on a platform or table 65. The upper end of arm 59 is pivotally mounted to table 65 at point 66.

A piston cylinder assembly 67 comprising a piston 68, pivotally connected at its free end to a bar 52a secured to arm 52 between pivot points 53 and 55 at 69, and a cylinder 70 pivoted to a bracket 71 on arm 59 at 71 raises or lowers table 65.

It will be understood that the lift mechanism comprises two sets of spaced apart arms and the various pivot points as described are provided on both sets of arms or by rods extending between the two sets of arms. The bar 52a extends between two spaced apart arms 52.

A suitable double scissors lift table is available from ECOA Hydraulic Lifts, Inc. of Bishamon Industries of Hialeah, Fla. Among others a model DSL-40048 is suitable. Such lift tables may utilize two or more piston-cylinder assemblies, depending on the load to be lifted.

As fluid under pressure is applied to cylinders 70, table 65 will be raised and as pressure in the cylinder is relieved, table 65 will be lowered. An operator is provided with foot operated controls to adjust the height of table 65 as hereinafter described.

A combination pneumatic and hydraulic power and control system 73 which controls the height of table 65 is included and is shown as carried on base 54, however, it may be mounted on arm 52a. The lift mechanism 45 may be enclosed within an accordian-type bellows or shroud.

Figure 4:
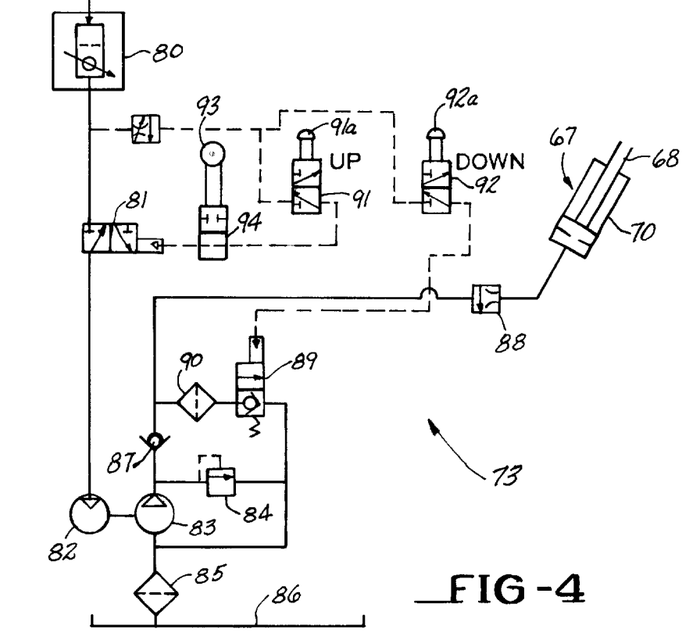
FIG. 4 is a schematic diagram of a pneumatic and hydraulic control system.

Reference is now made to FIG. 4 which exemplifies control system 73. In FIG. 5, solid lines are hydraulic lines and broken lines are pneumatic lines.

Control system 73 comprises a pneumatic-hydraulic control for adjusting the height of table 65. A source of air under pressure is connected through a filtering, pressure and regulating device 80 and a pilot-operated spring return valve 81 to an air motor 82. Air motor 82 is connected to drive a hydraulic pump 83 which has a relief valve 84 connected thereacross, which may dump through a filter 85 to reservoir 86. Pump 83 is also connected to reservoir 86 through filter 85. Pump 83 supplies fluid under pressure to piston-cylinder assembly 67 through a check valve 87 and a flow control valve 88. A two way air pilot operated-spring return hydraulic valve 89 may shunt hydraulic fluid around pump 83. Valve 89 is shown in a normally closed position, and includes a filter 90 in line therewith.

If valve 81 is opened (shown closed) it will convey air under pressure to motor 82 to drive pump 83 and cause the piston of piston cylinder assembly to extend and raise table 65. When valve 81 is closed, as shown, table 65 cannot be raised. When valve 89 is open, fluid will be relieved from cylinder and table 65 will descend.

The height of table 65 is controlled by two foot operated, spring return air valves 91 and 92, each having a foot pedal 91*a* and 92*a*, respectively. When valve 91 is opened by foot pressure, it will open valve 81, operate motor 82 which operates pump 83 to extend piston 67 and raise table 65. When foot pedal 91*a* is released, valve 81 will close, pump 83 will shut down and table 65 will be stationary. If foot pedal 92*a* is depressed, valve 92 applies air pressure to valve 89 which will open and relieve hydraulic pressure in cylinder and table 65 will retract. The time of depression of a foot pedal will determine the extent of movement of table 65. A limit switch 93 may be included to limit the elevation of table 65. Limit switch 93 may sense the angle of arm 52 (FIG. 5) and cause valve 94 to disable valve 81 and prevent operation of air motor 82. The air lines are connected through ports 27*a*–27*d* in rotating union 22 via duct 16 as required. If the control system 73 should be located external of the pit, only the hydraulic lines need be taken through the union.

Figure 5:
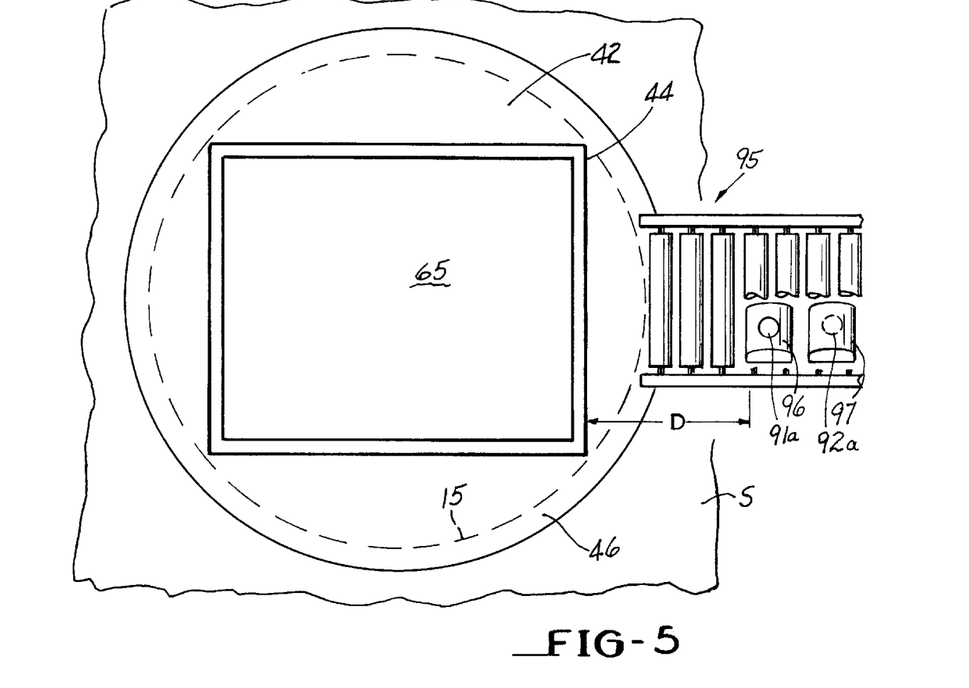
FIG. 5 is a plan view of the apparatus of FIG. 1 with the pallet removed, and further showing the proximity of the end of a conveyor.

FIG. 5 shows a plan view of the apparatus of FIG. 1 with the pallet P removed, and with the end of a conveyor 95 terminating at substantially the edge of the tub top 43 and flange 46. Conveyor 95 is normally supported on legs (not shown) and supports articles on the top of rollers which is hereinafter referred to as a surface.

Assume a pallet P is to be loaded with bags B arriving on conveyer 95. The loader will manipulate foot pedal 91*a* to raise table 65 to a comfortable height H2 above surface S as shown in FIG. 2. The loader will commence loading containers B on the pallet in a given number of stacks per level, rotating top member 43 with his foot acting on flange 46 as he starts each level of containers. When all containers of one level are loaded, the loader will depress foot pedal 92*a* to incrementally lower table 65 for the next level of containers B.

At each level the loader will appropriately rotate top member 43 to facilitate presentation of each stack of containers B adjacent the end of conveyor 94.

By way of example only, assume the conveyor height to be thirty-two inches above surface S. It would be ergonomically correct to have the pallet and each subsequent level of containers at a height of thirty inches above surface S. Then there is no bending over or lifting required to move a container from the conveyor to the pallet, only lateral movement from the conveyor to the pallet.

Where the operation is to unload containers from a pallet to a conveyor the relative heights may be reversed, i.e. the container height may be slightly greater than the conveyor height. Then there is no vertical lifting or bending required.

The foot pedals 91*a* and 92*a* are preferably placed just under the edge of the conveyor and in covered foot receptacles 96 and 97 (FIG. 5). This will prevent anyone other than the unloader from accidentally changing the height of table 65. Also the foot pedals should be placed a distance D from opening 44 in top member 43 so that the loader/unloader can not accidentally place a foot over the edge of opening 44 and depress a foot pedal at the same time. A distance D of four feet is deemed safe.

The term "pallet" has been used herein to donate an article supporting and carrying device commonly used in conjunction with fork lift trucks. The term pallet as used herein is intended to include any type of support and carrier for stacked articles.

It may thus be seen that the objects of the invention set forth above as well as those made apparent from the foregoing description are efficiently attained. Modifications to the disclosed embodiment of the invention as well as other embodiments thereof may occur to others skilled in the art. For example, the lifting means may be a table driven by a reversible electric motor controlled by loader/unloader operated foot pedals or other conveniently located switches. Accordingly, the appended claims are intended to cover all modifications to the disclosed embodiment as well as other embodiments of the invention which do not depart from the spirit and scope of the invention.

What is claimed is:

1. Apparatus for loading and unloading objects from a pallet placed thereon comprising, means defining a floor having an upper surface, a recess defined downwardly of said upper surface, a support member in the recess, a tub-like member rotatably mounted on said support member, said tub-like member having a vertical side wall and a top member with an outwardly extending annular flange having a surface substantially co-planar with the upper surface of the floor, means rotatably supporting said tub on said support member whereby said tub may be rotated by foot pressure on said flange, a vertically extensible lifting member within said tub and having an upper support surface, an opening in said top member permitting said vertically extensible member to extend therethrough, and means for controlling the vertical position of said support surface of said lifting member.

2. The apparatus of claim 1 wherein said flange overlies the edge defining the recess.

3. The apparatus of claim 1 wherein said recess includes a base member defining a lower floor, a non-rotatable first support member on the lower floor having a central opening therethrough, a second support member, bearing means rotatably mounting said second member on said first support member, said tub-like member and said lifting member being carried on said second support member.

4. The apparatus of claim 3 wherein said lifting member is fluid actuated and includes a fluid operated system for actuating said lifting means within said tub-like member, a rotating union centrally coupled to said second support member and defining fluid passages to said fluid operated system, and means external of said recess for applying fluid pressure to said fluid operated system through said union to vary the height of the support surface of said lifting member.

5. The apparatus of claim 4 wherein said means for controlling the height of said support surface are foot operated pedals external of the recess.

6. Apparatus for presenting a support surface at variable heights above and below a reference surface and permitting rotation of said support surface comprising a rotatable support member below the reference surface, lifting means including said support surface on said support member in a container having a top member with an opening therein for passage of said support surface therethrough, power operated means for said lifting means, manually operated means external of said container at substantially said reference level for operating said power means to vary the height of said support surface with respect to said reference level, said top member of said container being at substantially said reference level and accessible to foot pressure to rotate said container with said lifting means therein.

7. The apparatus of claim 6 wherein said support member forms the bottom wall of said container.

8. The apparatus of claim 6 wherein said reference surface is a floor and a recess is defined in said floor, said support surface adapted to receive a carrier having a plurality of stacks of containers thereon, and said manually operated means is effective to control said power operated means to present uppermost articles of the stacks at a selected dimension above the floor.

9. The apparatus of claim 6 wherein a support member defines a lower floor for said recess below said reference surface, a support plate in said recess on said floor and having a central aperture therethrough, bearing means rotatably carrying said support member on said support plate, a rotating union having fluid passages therethrough defined therein, said rotating union extending through said aperture in said support plate, said union comprising a housing and a shaft rotatable therein, said shaft being connected to said support member and rotatable therewith, means preventing rotation of said union housing, said power operated means being hydraulic fluid lines extending from said external manual means to said hydraulic power operated means to cause said hydraulic power operated means to adjust the height of said support surface.

10. The apparatus of claim 6 wherein the reference surface is a floor surface, a recess defined in said floor surface, said container residing within said recess, said recess being defined by an edge, said top member having a flange overlying said edge.

11. Apparatus for facilitating transfer of objects between a pallet and a conveyor comprising, means defining a floor having all upper surface, a recess defined downwardly of said upper surface, a support member in the recess, a tub-like member on said support member, said tub-like member having a vertical side wall and a top member with an outwardly extending annular flange having a surface substantially co-planar with the upper surface of the floor but slightly overlying the floor, means rotatably supporting said tub on said support member whereby said tub may be rotated by foot pressure on said flange, a vertically extensible lifting member within said tub and having an upper support member adapted to receive a pallet thereon, an opening in said top member permitting said vertically extensible member to extend therethrough, power operated means for controlling the vertical position of said support member of said lifting member, a conveyor having an article supporting surface supported a predetermined height above the floor, said conveyor having a portion thereof located adjacent said flange, said lifting member being vertically movable by said power operated means to vertically extend said support member an upper predetermined height above the floor and retract said support member a lower predetermined dimension below the floor whereby an article on said support member may be presented at a height above the floor substantially the same as the article supporting surface of said conveyor.

12. The apparatus of claim 11 further including operator controlled means for controlling said power operated means.

13. The apparatus of claim 12 wherein said operator controlled means are up and down foot pedals.

14. The apparatus of claim 13 wherein said foot pedals are mounted in said floor below the article supporting surface of said conveyor.

15. Apparatus for supporting an object at floor level and below comprising means defining a floor having an upper surface, a recess defined downwardly through said floor below said upper surface, a vertically extensible and retractable lifting means within said recess, power operated means for operating said lifting means, manually operated means external of said recess at substantially said upper surface for operating said power operated means to extend and retract said lifting means, a support means on said lifting means for receiving a load thereon, said support means being rotatable within said recess.

16. The apparatus of claim 15 wherin said support means is rotatable by manual force.

\* \* \* \* \*

UNITED STATES PATENT AND TRADEMARK OFFICE
CERTIFICATE OF CORRECTION

| | | |
|---|---|---|
| PATENT NO. | : 5,993,146 | Page 1 of 4 |
| DATED | : November 30, 1999 | |
| INVENTOR(S) | : Sigvard O. Hallgren | |

It is certified that error appears in the above-identified patent and that said Letters Patent is hereby corrected as shown below:

The title page should be deleted and substitute therefor the attached title page.

Column 1, lines 1-3, delete title of the invention and substitute therefor the following:
--VERTICALLY ADJUSTABLE AND ROTATABLE WORK SUPPORT TABLE--

Column 1, lines 6-8 should be deleted, and substitute therefor the following:
--This invention relates to a vertically adjustable and rotatable work table and particularly one which is adaptable for performing work on an object such as the loading and unloading of articles on pallets at a chosen height.--.

Column 5-8 should be deleted and substitute therefor columns 5-8, as shown on the attached pages.

Signed and Sealed this

Fifth Day of June, 2001

*Attest:*

*Attesting Officer*

Nicholas P. Godici

NICHOLAS P. GODICI
*Acting Director of the United States Patent and Trademark Office*

United States Patent [19]
Hallgren

[11] Patent Number: 5,993,146
[45] Date of Patent: *Nov. 30, 1999

[54] VERTICALLY ADJUSTABLE AND ROTATABLE WORK SUPPORT TABLE

[75] Inventor: Sigvard O. Hallgren, Branford, Conn.

[73] Assignee: Blakesle Arpia Chapman, Branford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/674,894

[22] Filed: Jul. 3, 1996

[51] Int. Cl.$^6$ ............................ B65G 57/22
[52] U.S. Cl. ............. 414/792.2; 414/672; 187/269
[58] Field of Search ......................... 414/592, 608, 414/619, 672, 673, 263, 791.6, 792.2; 187/269, 401

[56] References Cited

U.S. PATENT DOCUMENTS

| | | | |
|---|---|---|---|
| 1,405,301 | 1/1922 | De Vol | 187/269 |
| 2,284,531 | 5/1942 | Miller et al. | 187/269 |
| 2,515,075 | 7/1950 | Brereton | 187/401 |
| 2,642,957 | 6/1953 | Watts, Jr. et al. | 187/401 |
| 4,261,079 | 4/1981 | Masini et al. | |
| 4,298,305 | 11/1981 | Neth | |
| 4,356,887 | 11/1982 | Fisher et al. | |
| 4,594,044 | 6/1986 | Soot | |
| 4,830,147 | 5/1989 | Kanoda | |
| 4,941,797 | 7/1990 | Smillie, III | 187/269 |
| 4,946,006 | 8/1990 | Kume | |
| 5,018,923 | 5/1991 | Melan et al. | |
| 5,281,017 | 1/1994 | Geiss | |
| 5,299,906 | 4/1994 | Stone | 187/269 |

FOREIGN PATENT DOCUMENTS

198916  8/1958  Germany .................. 414/672

OTHER PUBLICATIONS

Southworth Products Corp., "Pallet Level Loaders", 4 pages, 1995.

Primary Examiner—Karen B. Merritt
Assistant Examiner—Gregory A. Morse
Attorney, Agent, or Firm—Robert H. Montgomery

[57] ABSTRACT

Apparatus for supporting objects on a table above and below a floor level which apparatus is vertically movable to present the table at various heights and is also rotatable. Apparatus embodying the invention is adaptable for loading and unloading stacked containers on or from a carrier such as a pallet. For the application of stacking or un-stacking containers on a carrier such as pallets a tub-like member is recessed below floor surface level in a pit and carries therein an extendable and retractable lifting mechanism. The tub includes a horizontal outwardly extending flange essentially at floor surface level, and overlying the floor surface, which a loader/unloader may easily manipulate with foot pressure to rotate the tub and stacked articles on a pallet carried on the lifting mechanism within the tub-like member. Easily operable controls are provided for the loader/unloader to incrementally raise and lower the lifting mechanism to present the top article of a stack on a pallet at a comfortable lifting height. Also included is a new and improved mechanism for supporting a pallet for manual rotation and incrementally controlled vertical movement.

21 Claims, 3 Drawing Sheets lating device 80 and a pilot-operated spring return valve 81 to an air motor 82. Air motor 82 is connected to drive a hydraulic pump 83 which has a relief valve 84 connected thereacross, which may dump through a filter 85 to reservoir 86. Pump 83 is also connected to reservoir 86 through filter 85. Pump 83 supplies fluid under pressure to piston-cylinder assembly 67 through a check valve 87 and a flow control valve 88. A two way air pilot operated-spring return hydraulic valve 89 may shunt hydraulic fluid around pump 83. Valve 89 is shown in a normally closed position, and includes a filter 90 in line therewith.

If valve 81 is opened (shown closed) it will convey air under pressure to motor 82 to drive pump 83 and cause the piston of piston cylinder assembly 67 to extend and raise table 65. When valve 81 is closed, as shown, table 65 cannot be raised. When valve 89 is open, fluid will be relieved from cylinder and table 65 will descend.

The height of table 65 is controlled by two foot operated, spring return air valves 91 and 92, each having a foot pedal 91a and 92a, respectively. When valve 91 is opened by foot pressure, it will open valve 81, operate motor 82 which operates pump 83 to extend piston 67 and raise table 65. When foot pedal 91a is released, valve 81 will close, pump 83 will shut down and table 65 will be stationary. If foot pedal 92a is depressed, valve 92 applies air pressure to valve 89 which will open and relieve hydraulic pressure in cylinder and table 65 will retract. The time of depression of a foot pedal will determine the extent of movement of table 65. A limit switch 93 may be included to limit the elevation of table 65. Limit switch 93 may sense the angle of arm 52 (FIG. 5) and cause valve 94 to disable valve 81 and prevent operation of air motor 82. The air lines are connected through ports 27a–27d in rotating union 22 via duct 16 as required. If the control system 73 should be located external of the pit, only the hydraulic lines need be taken through the union.

FIG. 5 shows a plan view of the apparatus of FIG. 1 with the pallet P removed, and with the end of a conveyor 95 terminating at substantially the edge of the tub top 43 and flange 46. Conveyor 95 is normally supported on legs (not shown) and supports articles on the top of rollers which is hereinafter referred to as a surface.

Assume a pallet P is to be loaded with bags B arriving on conveyer 95. The loader will manipulate foot pedal 91a to raise table 65 to a comfortable height H2 above surface S as shown in FIG. 2. The loader will commence loading containers B on the pallet in a given number of stacks per level, rotating top member 43 with his foot acting on flange 46 as he starts each level of containers. When all containers of one level are loaded, the loader will depress foot pedal 92a to incrementally lower table 65 for the next level of containers B.

At each level the loader will appropriately rotate top member 43 to facilitate presentation of each stack of containers B adjacent the end of conveyor 94.

By way of example only, assume the conveyor height to be thirty-two inches above surface S. It would be ergonomically correct to have the pallet and each subsequent level of containers at a height of thirty inches above surface S. Then there is no bending over or lifting required to move a container from the conveyor to the pallet, only lateral movement from the conveyor to the pallet.

Where the operation is to unload containers from a pallet to a conveyor the relative heights may be reversed, i.e. the container height may be slightly greater than the conveyor height. Then there is no vertical lifting or bending required.

The foot pedals 91a and 92a are preferably placed just under the edge of the conveyor and in covered foot receptacles 96 and 97 (FIG. 5). This will prevent anyone other than the unloader from accidentally changing the height of table 65. Also the foot pedals should be placed a distance D from opening 44 in top member 43 so that the loader/unloader can not accidentally place a foot over the edge of opening 44 and depress a foot pedal at the same time. A distance D of four feet is deemed safe.

The term "pallet" has been used herein to donate an article supporting and carrying device commonly used in conjunction with fork lift trucks. The term pallet as used herein is intended to include any type of support and carrier for stacked articles.

It may thus be seen that the objects of the invention set forth above as well as those made apparent from the foregoing description are efficiently attained. Modifications to the disclosed embodiment of the invention as well as other embodiments thereof may occur to others skilled in the art. For example, the lifting means may be a table driven by a reversible electric motor controlled by loader/unloader operated foot pedals or other conveniently located switches. Accordingly, the appended claims are intended to cover all modifications to the disclosed embodiment as well as other embodiments of the invention which do not depart from the spirit and scope of the invention.

What is claimed is:

1. Apparatus for loading and unloading objects from a pallet comprising, means defining a floor having an upper surface, a recess defined downwardly of said upper surface, a support member in said recess, an open top tub-like member rotatably mounted on said support member, said tub-like member having a vertical side wall and a top outwardly extending annular flange having a surface substantially co-planar with the surface of the floor, means rotatably supporting said tub on said support member whereby said tub-like member may be rotated by foot pressure on said flange, a vertically extensible lifting member within said tub-like member and having an upper support surface, and means for controlling the vertical position of said support surface of said lifting member.

2. The apparatus of claim 1 wherein said flange overlies the edge defining the recess.

3. The apparatus of claim 1 wherein said recess includes a base member defining a lower floor, a non-rotatable first support member on the lower floor having a central opening therethrough, a second support member, bearing means rotatably mounting said second member on said first support member, said tub-like member and said lifting member being carried on said second support member.

4. The apparatus of claim 3 wherein said lifting member is fluid actuated and includes a fluid operated system for actuating said lifting means within said tub-like member, a rotating union centrally coupled to said second support member and defining fluid passages to said fluid operated system, and means external of said recess for applying fluid pressure to said fluid operated system through said union to vary the height of the support surface of said lifting member.

5. The apparatus of claim 4 wherein said means for controlling the height of said support surface are foot operated pedals external of the recess.

6. Apparatus for presenting a support surface at variable heights above and below a reference surface and permitting rotation of said support surface comprising a rotatable support member below the reference surface, lifting means including said support surface on said support member in a container having a top opening for passage of said support surface therethrough, power operated hydraulic means for said lifting means, manually operated means external of said container at substantially said reference level for operating said hydraulic power means to vary the height of said support surface with respect to said reference surface, said container having an annular flange at substantially said reference surface and accessible to foot pressure to rotate said container with said lifting means therein.

7. The apparatus of claim 6 wherein said support member forms the bottom wall of said container.

8. The apparatus of claim 6 wherein said reference surface is a floor and a recess is defined in said floor, said support surface adapted to receive a carrier having a plurality of stacks of containers thereon, and said manually operated means is effective to control said power operated means to present uppermost articles of the stacks at a selected dimension above the floor.

9. The apparatus of claim 6 wherein a support member defines a lower floor for a recess below said reference surface, a support plate in said recess on said floor and having a central aperture therethrough, bearing means rotatably carrying said support member on said support plate, a rotating union having fluid passages therethrough, said rotating union extending through said aperture in said support plate, said union comprising a housing having a shaft rotatable therein, said shaft being connected to said support member and rotatable therewith, means preventing rotation of said union housing, said power operated hydraulic means including hydraulic lines fluid lines extending from said external manual means to said hydraulic power operated means to cause said hydraulic power operated means to adjust the height of said support surface.

10. The apparatus of claim 6 wherein the reference surface is a floor surface, a recess defined through said floor surface, said container residing within said recess, said recess having an edge, said container having a flange overlying said edge.

11. Apparatus for facilitating transfer of objects between a pallet and a conveyor comprising means defining a floor having an upper surface, a recess downwardly of said upper surface, a support member in the recess, an open top tub-like member on said support member, said tub-like member having a vertical side wall and a top outwardly extending annular flange having a surface substantially co-planar the upper surface of the floor but slightly overlying the floor, means rotatably supporting said tub-like member on said support member whereby said tub-like member member may be rotated by foot pressure on said flange, a vertically extensible lifting member in said tub-like member having an upper support member adapted to receive a pallet thereon, power operated means for controlling the vertical position of said support member, a conveyor having an object supporting surface a predetermined height above the floor, said conveyor having a portion thereof located adjacent said flange, said lifting member being vertically movable by said power operated means to vertically extend said support member an upper predetermined height above the floor and retract said support member a lower predetermined dimension below the floor whereby an object on said support member may be presented at a height above the floor substantially the same as the object supporting surface of said conveyor.

12. The apparatus of claim 11 further including operator controlled means for controlling said power operated means.

13. The apparatus of claim 12 wherein said operator controlled means are up and down foot operated switches having actuating pedals at substantially floor surface level.

14. The apparatus of claim 13 wherein said foot switches are mounted in said floor below the article supporting surface of said conveyor and said pedals are at substantially floor level.

15. Apparatus for supporting an object at floor level and below comprising means defining a floor having an upper surface, a recess defined downwardly through said floor below said upper surface, a vertically extensible and retractable lifting means within said recess, power operated means for operating said lifting means, manually operated means external of said recess at substantially said upper surface for operating said power operated means to extend and retract said lifting means, a support means on said lifting means for receiving a load thereon, said support means being rotatable within said recess.

16. The apparatus of claim 15 wherin said support means is rotatable by manual force.

17. The apparatus of claim 16 wherein said manually operated means for operating said lifting means are foot operated switches external of the recess.

18. The apparatus of claim 16 wherein said lifting means is received within said recess on a tub-like member having an annular flange overlying said upper surface and said tub-like member may be rotated by foot pressure on said flange to rotate said lifting means said and said support thereon.

19. The apparatus of claim 18 wherein said lifting means is fluid actuated and includes a fluid operated system for actuating said lifting means within said tub-like member, a rotating union centrally coupled to said second support member and defining fluid passages to said fluid operated system and means external of said recess for applying fluid pressure to said fluid operated system through said union to vary the height of the support surface of said lifting member.

20. The apparatus of claim 15 wherein said recess receives a base member defining a lower floor, a first non-rotatable support member on the lower floor having a central opening therethrough, a second support member rotatably mounted on said first support member, a tub-like member carried on said second support member, bearing means rotatably mounting said second support member on said first support member, said lifting member received within said tub-like member.

21. The apparatus of claim 15 wherein a support member defines a lower floor for said recess below said upper surface, a support plate in said recess on said lower floor and having a central aperture therethrough, bearing means rotatably carrying said support means on said support member, a rotating union having fluid passages therethrough, said rotating union extending through said aperture in said support plate, said union comprising a housing and a shaft rotatable therein, said shaft being connected to said support means and rotatable therewith, means preventing rotation of said union housing, power operated means for said lifting means, manually operated means external of said recess at substantially said floor level for operating said power operated means to vary the height of said support means with respect to said floor level.

* * * * *